US00RE39372E

(19) United States
(12) Reissued Patent
Kuo

(10) Patent Number: US RE39,372 E
(45) Date of Reissued Patent: Nov. 7, 2006

(54) PUNCHING BAG

(75) Inventor: James Y. C. Kuo, Taichung (TW)

(73) Assignee: Minatsu Taiwan Corp., Taichung (TW)

(21) Appl. No.: 29/210,633

(22) Filed: Aug. 3, 2004

Related U.S. Patent Documents

Reissue of:
(64) Patent No.: Des. 409,670
Issued: May 11, 1999
Appl. No.: 29/069,473
Filed: Apr. 2, 1997

U.S. Applications:
(63) Continuation-in-part of application No. 08/729,451, filed on Oct. 11, 1996, now abandoned.

(51) LOC (8) Cl. ..... 21-02
(52) U.S. Cl. ..... D21/787; D21/798
(58) Field of Classification Search ..... D21/662, D21/787, 798; 482/83, 85, 86, 87, 89, 90
See application file for complete search history.

(56) References Cited

U.S. PATENT DOCUMENTS

| | | | |
|---|---|---|---|
| 2,913,245 | A | 11/1959 | Landis |
| 2,937,872 | A | 5/1960 | Gilman |
| 4,151,676 | A | 5/1979 | Clark |
| 4,268,030 | A | 5/1981 | Richards |
| 4,330,119 | A | 5/1982 | Marshall, Jr. |
| 4,486,016 | A | 12/1984 | Rubin |
| 4,903,966 | A | 2/1990 | Liao |
| D311,552 | S | 10/1990 | Kubiatowicz |
| D325,233 | S | 4/1992 | Brunette |
| 5,330,403 | A | 7/1994 | Kuo |
| 5,415,552 | A | 5/1995 | Harmon et al. |
| 5,437,590 | A | 8/1995 | D'Alto |
| 5,624,358 | A | 4/1997 | Hestilow |

FOREIGN PATENT DOCUMENTS

| | | |
|---|---|---|
| GB | 1 443 017 | 7/1976 |

*Primary Examiner*—Philip S. Hyder
(74) *Attorney, Agent, or Firm*—Christensen O'Connor Johnson Kindness PLLC

(57) CLAIM

The ornamental design for a punching bag, as shown and described.

DESCRIPTION

FIG. 1 is a perspective view of punching bag showing my new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom plan view thereof.

1 Claim, 4 Drawing Sheets

Figure 1:
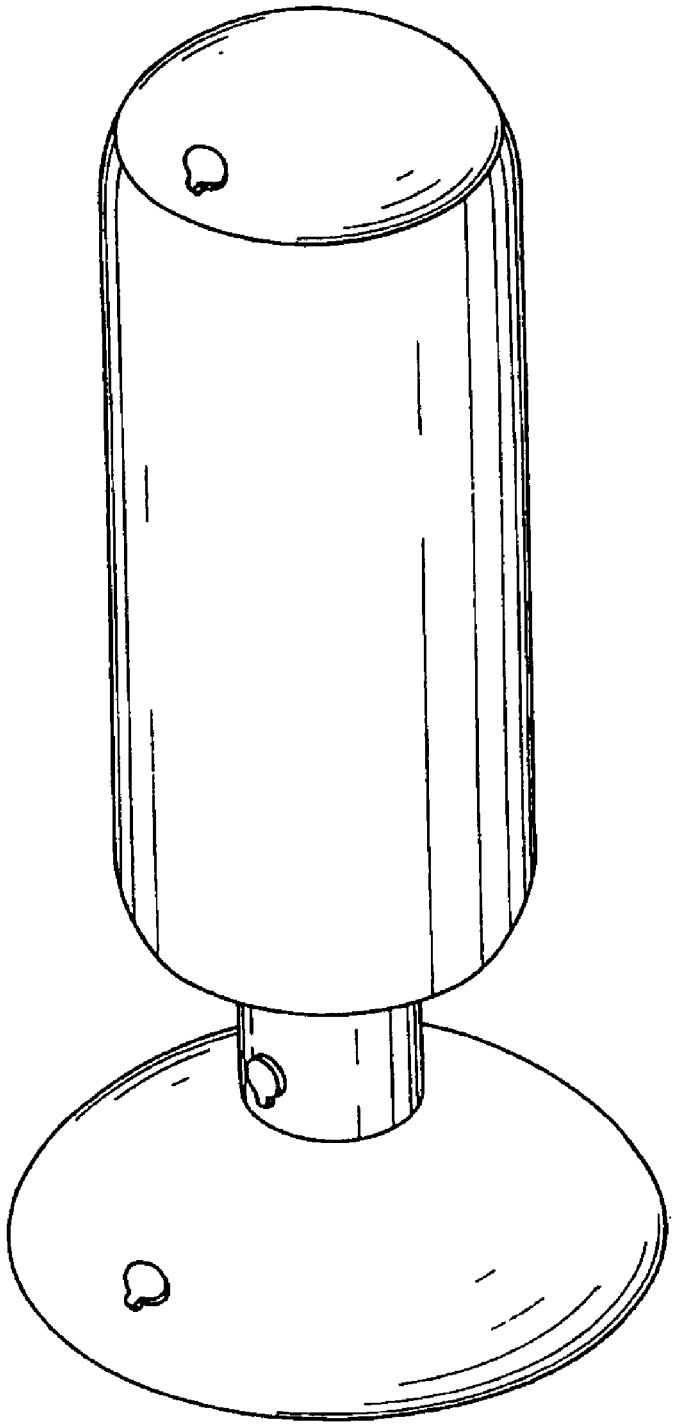
Figure 2:
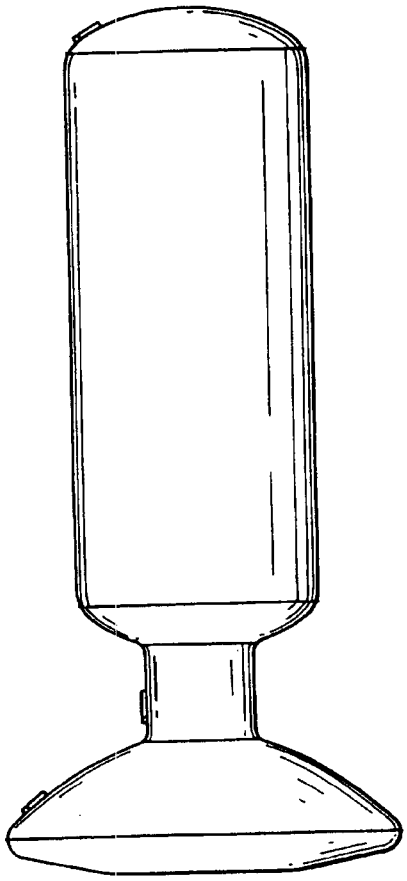
Figure 3:
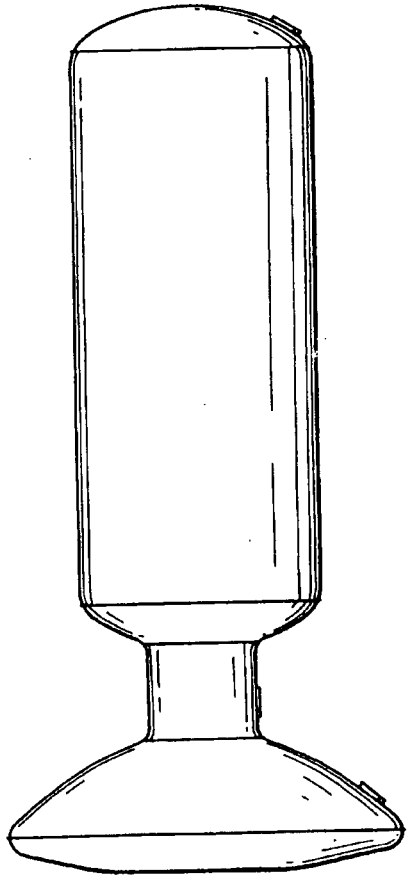
Figure 4:
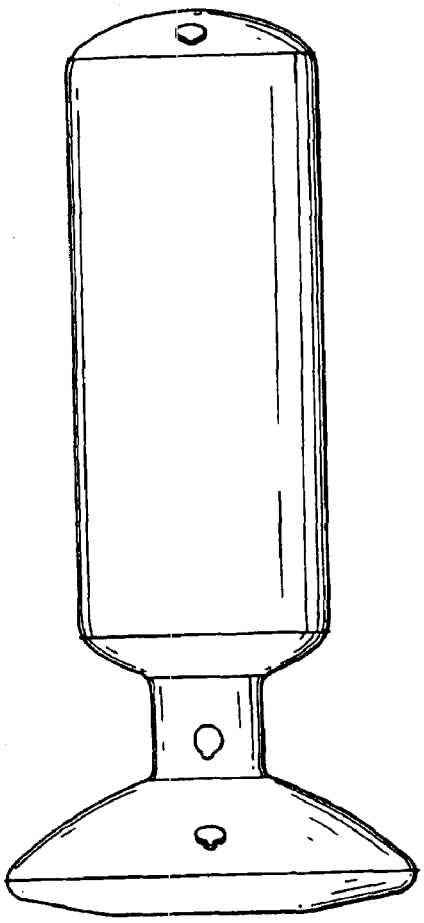
Figure 5:
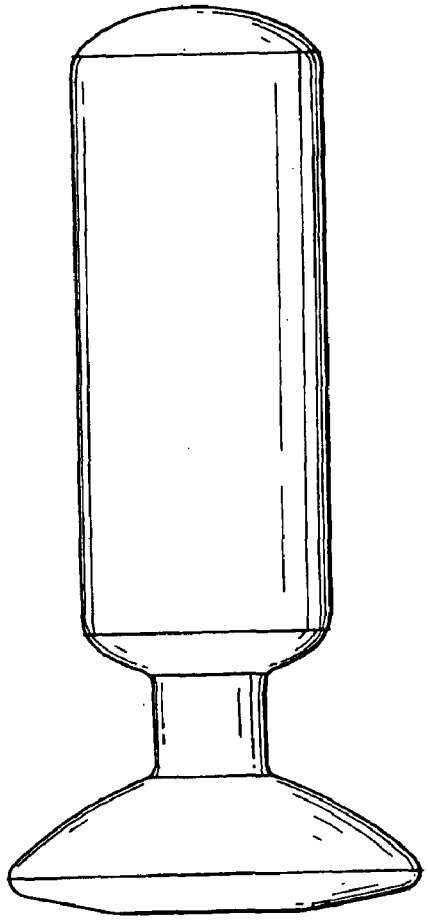
Figure 6:
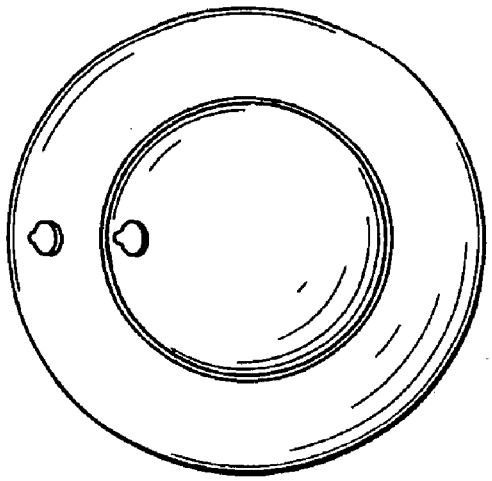
Figure 7:
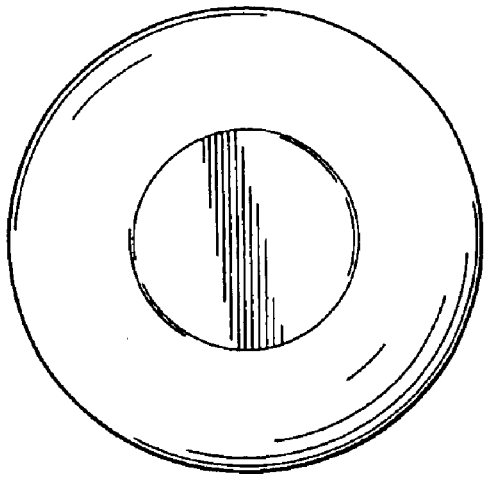

Matter enclosed in heavy brackets [ ] appears in the original patent, but forms no part of this reissue; matter printed in italics indicates the additions made by reissue.